United States Patent
Kameoka

(10) Patent No.: US 8,223,276 B2
(45) Date of Patent: Jul. 17, 2012

(54) CABINET OF ELECTRONIC EQUIPMENT

(75) Inventor: Shinichi Kameoka, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1210 days.

(21) Appl. No.: 12/010,546

(22) Filed: Jan. 25, 2008

(65) Prior Publication Data

US 2008/0180002 A1  Jul. 31, 2008

(30) Foreign Application Priority Data

Jan. 26, 2007  (JP) ................................. 2007-015864

(51) Int. Cl.
*H04N 5/645* (2006.01)
(52) U.S. Cl. ....... 348/836; 312/223.2; 312/7.2; 361/756
(58) Field of Classification Search .................. 348/836; 312/7.2, 223.1, 223.2, 327, 328; 361/756, 361/804, 807, 814
See application file for complete search history.

(56) References Cited

U.S. PATENT DOCUMENTS

| | | | | |
|---|---|---|---|---|
| 4,685,558 A | * | 8/1987 | Filiz et al. | 206/1.5 |
| 5,079,799 A | * | 1/1992 | Rude et al. | 16/342 |
| 5,231,734 A | * | 8/1993 | Rude | 16/342 |
| 5,793,742 A | * | 8/1998 | Sandell et al. | 720/734 |
| 5,936,842 A | * | 8/1999 | Kaiser et al. | 361/752 |
| 5,992,681 A | * | 11/1999 | Byrd et al. | 220/831 |
| 6,034,745 A | * | 3/2000 | Cho | 348/836 |
| 6,045,783 A | * | 4/2000 | Macchio et al. | 424/64 |
| 6,426,784 B1 | | 7/2002 | Sakai et al. | 349/58 |
| 6,650,545 B1 | * | 11/2003 | Ootori et al. | 361/729 |
| 6,688,710 B2 | * | 2/2004 | Tagawa | 312/223.2 |
| 6,695,417 B2 | * | 2/2004 | Maruta | 312/7.2 |
| 2005/0057124 A1 | | 3/2005 | Maruta | 312/7.2 |
| 2006/0023141 A1 | | 2/2006 | Oka | 349/58 |
| 2006/0238663 A1 | * | 10/2006 | Maruta | 348/836 |
| 2008/0122993 A1 | * | 5/2008 | Nakamichi et al. | 348/789 |

FOREIGN PATENT DOCUMENTS

| | | |
|---|---|---|
| DE | 10 2004 035 497 | 2/2005 |
| JP | 64-037183 | 2/1989 |
| JP | 06-311459 | 11/1994 |
| JP | 3090702 U | 12/2002 |

* cited by examiner

*Primary Examiner* — Annan Shang
(74) *Attorney, Agent, or Firm* — Morgan, Lewis & Bockius LLP

(57) ABSTRACT

A cabinet of electronic equipment includes a box-type first case with an open side made of a resin, and a box-type second case with an open side made of a resin to be fixed to the first case by engagement. An open part of the second case is engaged with an open part of the first case, and a plurality of hook formed on an inner wall of the open part of the first case are engaged with a plurality of engaging holes that are formed to pass through a wall of the open part of the second case and are elongated in the direction perpendicular to an engaging direction of the first and the second cases from an outer face side of the second case, so that the first and the second cases are coupled. A rib that crosses the engaging hole in its short side direction is formed integrally to the second case on its inner wall.

3 Claims, 7 Drawing Sheets

CABINET OF ELECTRONIC EQUIPMENT

This application is based on Japanese Patent Application No. 2007-15864 filed on Jan. 26, 2007, the contents of which are hereby incorporated by reference.

BACKGROUND OF THE INVENTION

1. Field of the Invention

The present invention relates to a cabinet of electronic equipment (e.g., a liquid crystal television receiver), which is assembled of two open box-type cases.

2. Description of Related Art

A conventional cabinet of a liquid crystal television receiver will be described as an example with reference to the attached drawings.

FIG. 5 is an exploded diagram of the conventional liquid crystal television receiver, in which a main circuit board and a rear case are detached to be viewed. As shown in FIG. 5, a cabinet of the liquid crystal television receiver 1 includes a box-type front case 2 with an open rear side in which a liquid crystal module 4 and a main circuit board 5 are arranged, and a box-type rear case 3 with an open front side that is fit in the open rear part of the front case 2 so that they are engaged with each other. An open front part of the rear case 3 is formed thin to have a step on its outer face, which is engaged with the open rear part of the front case 2. When they are engaged with each other, a plurality of hooks 2a formed on the inner wall of the open rear part of the front case 2 respectively engage corresponding elongated holes as a plurality of engaging holes 3a formed in the open front part of the rear case 3 to pass through its wall, so that the front case 2 and the rear case 3 are coupled to each other.

The front case 2 is provided with a sheet metal attachment 6 for attaching the main circuit board 5 to the rear side of the liquid crystal module 4 as shown in FIG. 5. The sheet metal attachment 6 is provided with a plurality of backup parts 61 each of which has a threaded hole 61a, and they are formed by cutting and raising the sheet metal attachment 6. The main circuit board 5 is fixed to the sheet metal attachment 6 with screws 7 that pass through a plurality of holes 51 formed in the main circuit board 5 and are fastened to threaded holes 61a of the backup parts 61 of the sheet metal attachment 6.

FIG. 6 shows a vertical section of a die for molding the conventional rear case, FIG. 7 shows a cross section of the die cut along the dashed dotted line in FIG. 6, and FIG. 8 is a perspective view of the conventional rear case viewed from the open side. As shown in FIGS. 6 and 7, a first die 101 having a recess and a second die 102 having a salient are combined so that the recess and the salient are engaged with each other when the rear case 3 is molded. On this occasion, the recess and the salient are opposed to each other with a predetermined space between them, which forms a cavity 103. The rear case 3 is molded by filling a melted resin material (hereinafter referred to as a "material" simply) in the cavity 103 and curing the material. The material is injected into the cavity 103 through an injection 101a that is formed to pass through the first die 101. The first die 101 is provided with a plurality of protrusions 101b at positions corresponding to the plurality of engaging holes 3a of the rear case 3 (see FIG. 5) so as to form the engaging holes 3a. The injected material fills the cavity 103 and finally goes around the protrusion 101b from its rear (the right in FIG. 6) to its both sides (the front and the back of paper of FIG. 6) so as to reach the vertical face of the second die 102, and flows of the material from both sides go to the front of the protrusion 101b (the left in FIG. 6) so as to meet at the middle part.

Therefore, when the molded rear case 3 is viewed from the open side as shown in FIG. 8, a so-called weld line 3b may be generated at each part where the flows of the material meet as shown in FIG. 9 because the meeting flows of the material may be cured before they are mixed completely. This weld line 3b is a type of defective molding that causes deterioration of strength of the resin product. As a result, if the hook 2a and the engaging hole 3a are hard to catch each other when the front case 2 and the rear case 3 are coupled, a stress exerting on the periphery of the engaging hole 3a of the rear case 3 may cause a crack along the weld line 3b resulting in a breakage of the rear case 3.

JP-A-H6-311459, Japanese Utility Model No. 3090702 and JP-A-S64-37183 disclose assembly structures of cabinets of television receivers, but they do not disclose any structure of the cabinet as described above, in which the rear case has engaging holes with which hooks of the front case are engaged.

SUMMARY OF THE INVENTION

An object of the present invention is to provide a cabinet of electronic equipment that can suppress an occurrence of a weld line so that the periphery of the engaging hole can be reinforced, as well as a liquid crystal television receiver having the cabinet.

A cabinet of electronic equipment according to an embodiment of the present invention includes a box-type first case with an open side made of a resin, and a box-type second case with an open side made of a resin to be fixed to the first case by engagement. An open part of the second case is engaged with an open part of the first case, and a plurality of hook formed on an inner wall of the open part of the first case are engaged with a plurality of engaging holes that are formed to pass through a wall of the open part of the second case and are elongated in the direction perpendicular to an engaging direction of the first and the second cases from an outer face side of the second case, so that the first and the second cases are coupled. A rib that crosses the engaging hole in its short side direction is formed integrally to the second case on its inner wall.

According to this structure, a die for molding the second case is provided with a groove for forming a rib, which extends over a protrusion for forming the engaging hole. This groove provides a channel for a material to flow when the second case is molded. Therefore, the material can flow to a point where flows of the resin go around both sides of the protrusion to the front and meet. Therefore, an occurrence of a weld line is suppressed so that deterioration of strength of the second case due to the engaging holes can be prevented. In addition, since the rib crossing the engaging hole in its short side direction is formed integrally on the molded second case, a periphery of the engaging hole of the second case can be reinforced.

In addition, as to the cabinet of electronic equipment according to another embodiment of the present invention, a plurality of the ribs are provided for the engaging hole so as to be arranged in the longitudinal direction of the engaging hole.

According to this structure, since the plurality of ribs are formed so as to be arranged in the longitudinal direction of each of the engaging holes of the rear case, the periphery of the engaging hole of the second case can be reinforced more strongly.

The electronic equipment to which the present invention is applied can be a flat display device such as a liquid crystal television receiver, for example.

DETAILED DESCRIPTION OF THE PREFERRED EMBODIMENTS

Figure 1:
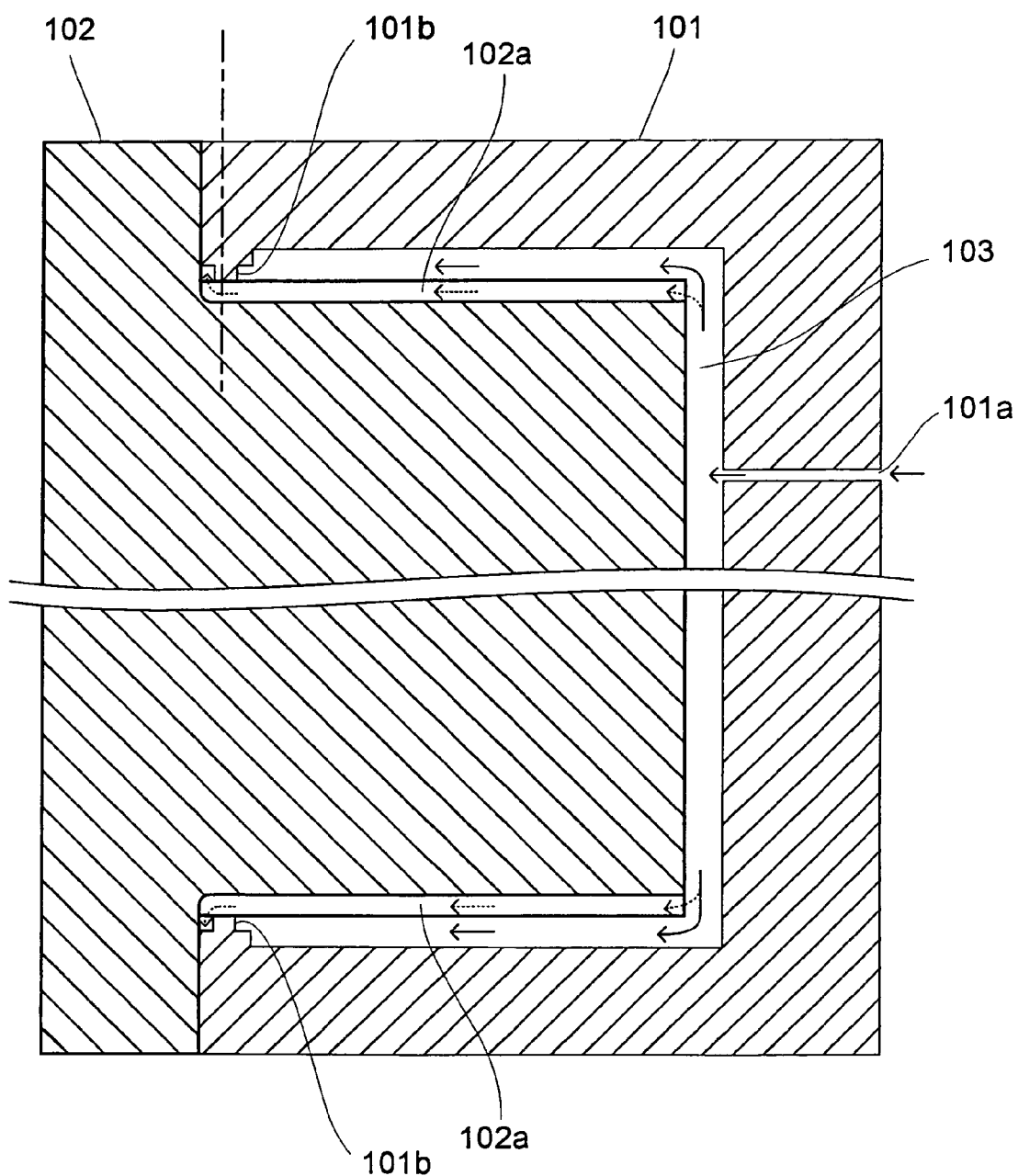
FIG. 1 shows a vertical section of a die for molding a rear case that constitutes a cabinet of a liquid crystal television receiver according to an embodiment of the present invention.

Hereinafter, a preferred embodiment of the present invention will be described with reference to the attached drawings. In the following description, the same parts as those of the conventional liquid crystal television receiver shown in FIGS. 5-9 are denoted by the same reference numerals so that a detailed description thereof will be omitted.

Figure 2:
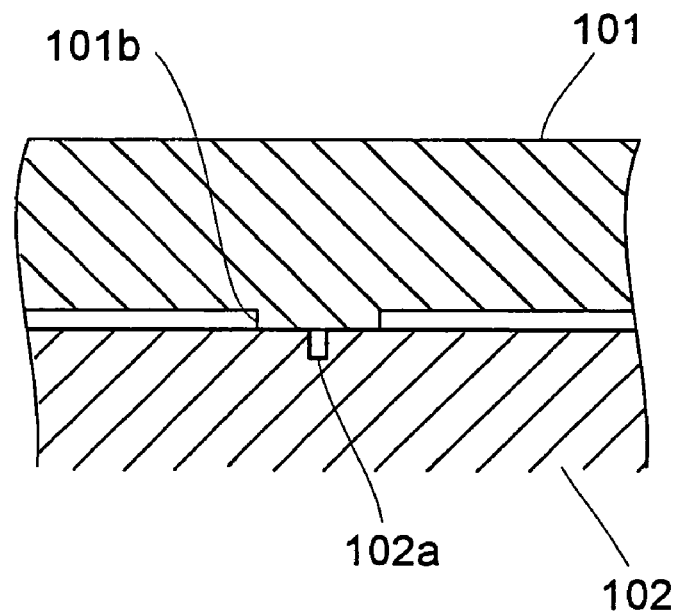
FIG. 2 is a cross section of the die shown in FIG. 1 cut along the dashed dotted line.

FIG. 1 shows a vertical section of a die for molding a rear case that constitutes a cabinet of a liquid crystal television receiver according to an embodiment of the present invention, and FIG. 2 is a cross section of the die shown in FIG. 1 cut along the dashed dotted line. As shown in FIGS. 1 and 2, the second die 102 is provided with grooves 102a that extend over the protrusion 101b of the first die 101 at the middle part of the protrusion 101b in its longitudinal direction (the direction perpendicular to the paper of FIG. 1 and the horizontal direction in FIG. 2). The groove 102a forms a channel in the cavity 103 for the material to flow over the protrusion 101b as shown by the arrow with the dotted line in FIG. 1. Therefore, the front side of the protrusion 101b where the flows of the material meet can be supplied with another flow of the material through the channel. Thus, an occurrence of a weld line can be suppressed so that deterioration of strength of the rear case 3 can be prevented.

Figure 3:
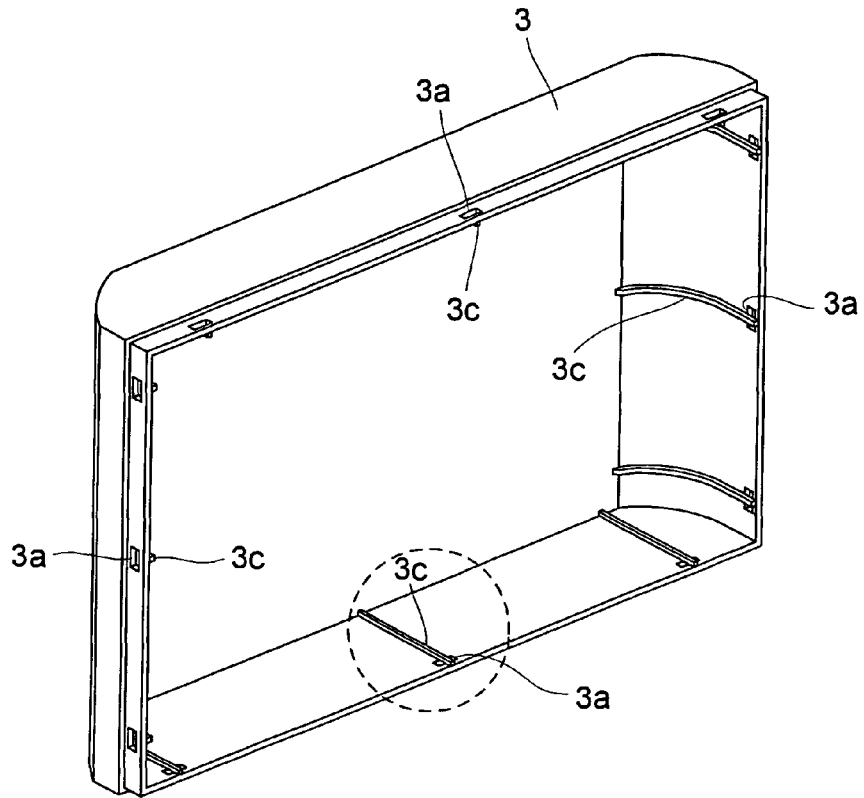
FIG. 3 is a perspective view of a rear case according to the embodiment viewed from the open side.
Figure 4:
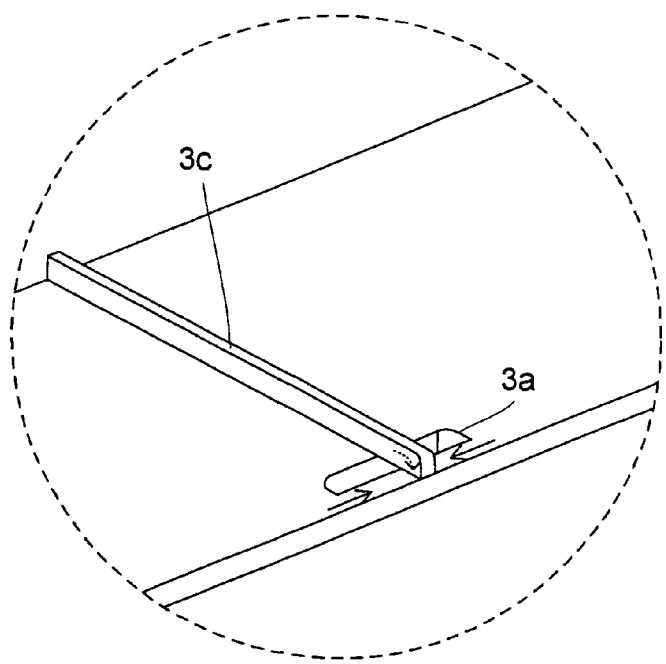
FIG. 4 is a magnified view of the part encircled by the broken line in FIG. 3.
Figure 5:
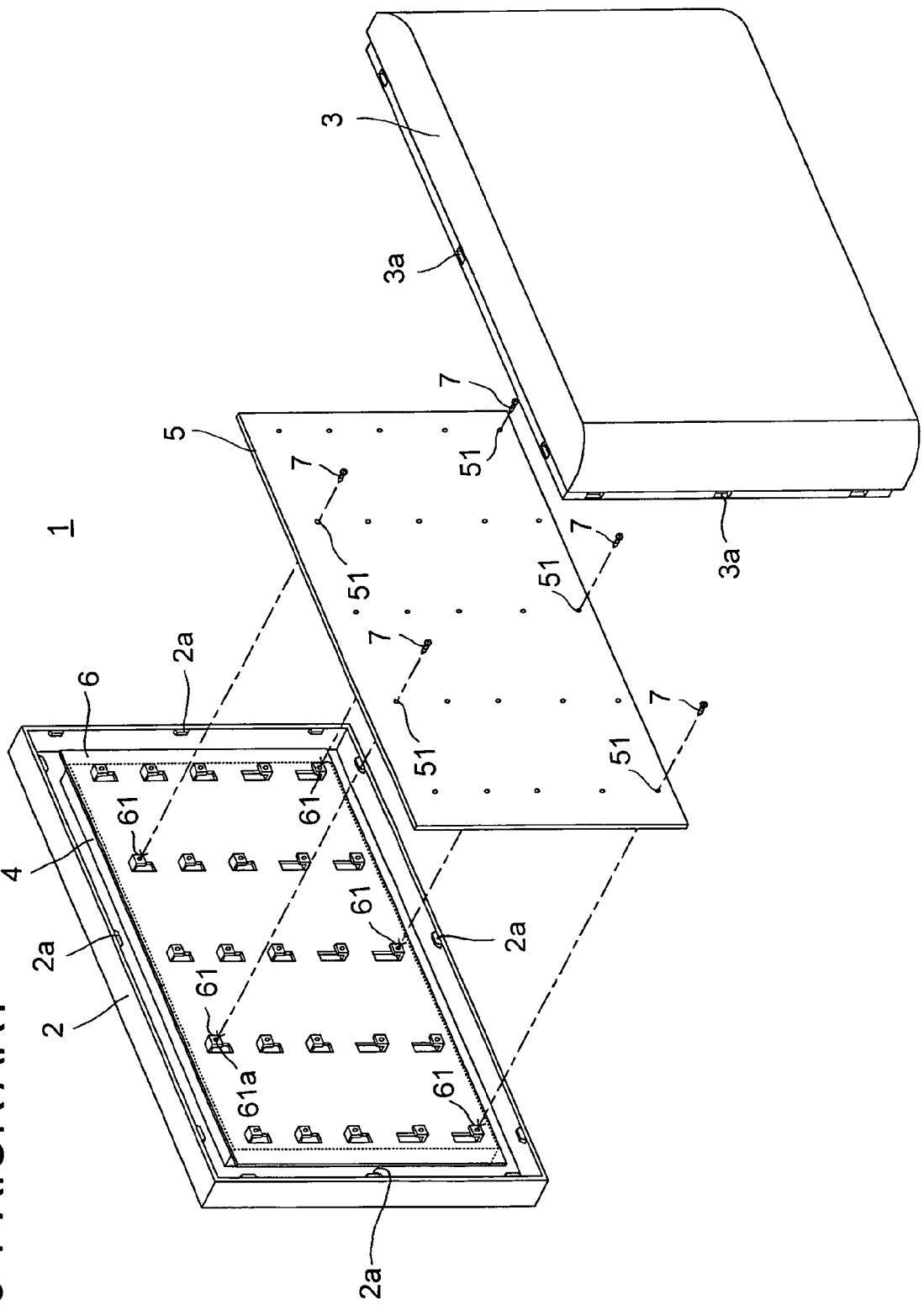
FIG. 5 is an exploded diagram of a conventional liquid crystal television receiver, in which a main circuit board and a rear case are detached to be viewed.
Figure 6:
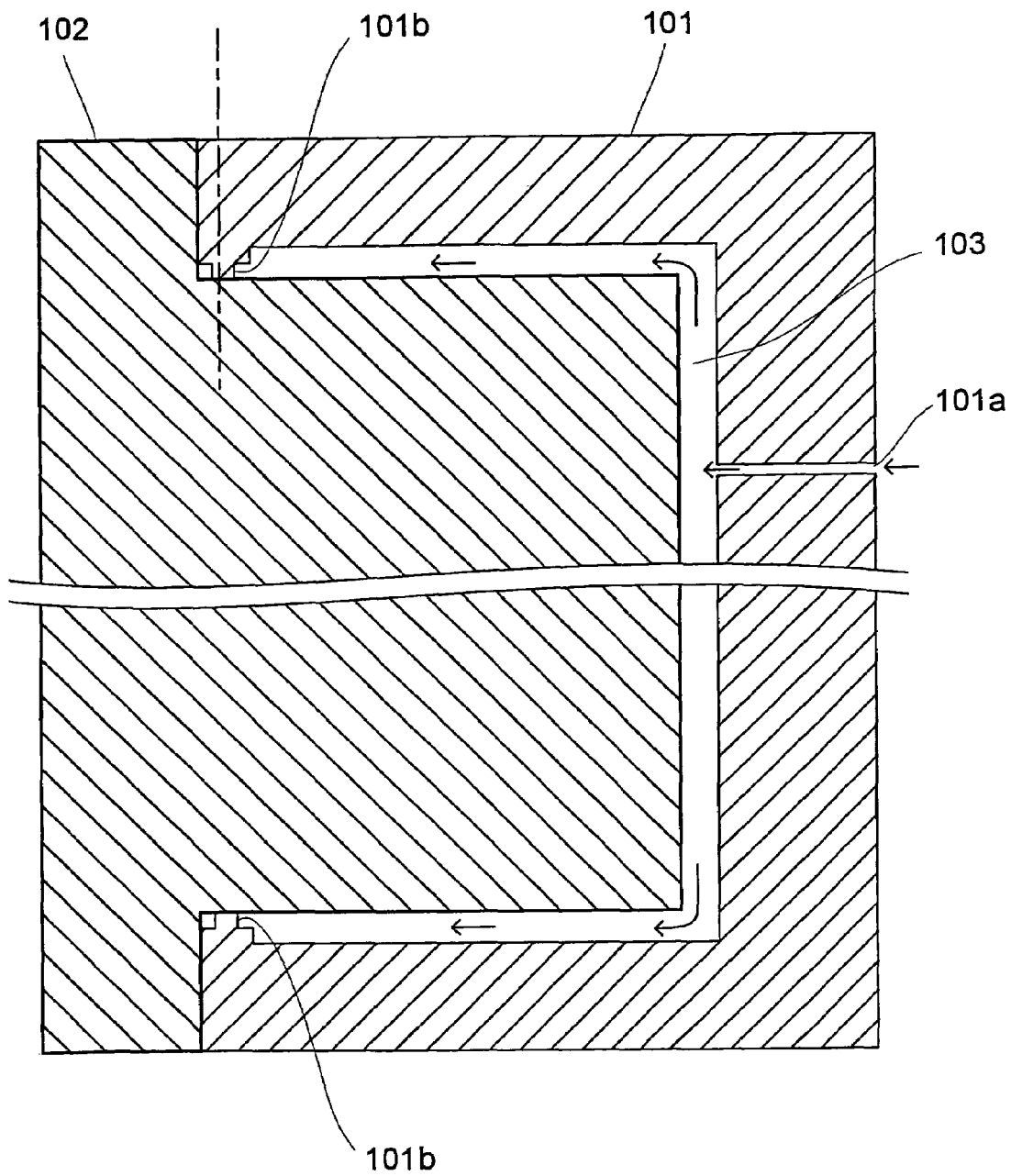
FIG. 6 shows a vertical section of a die for molding the conventional rear case.
Figure 7:
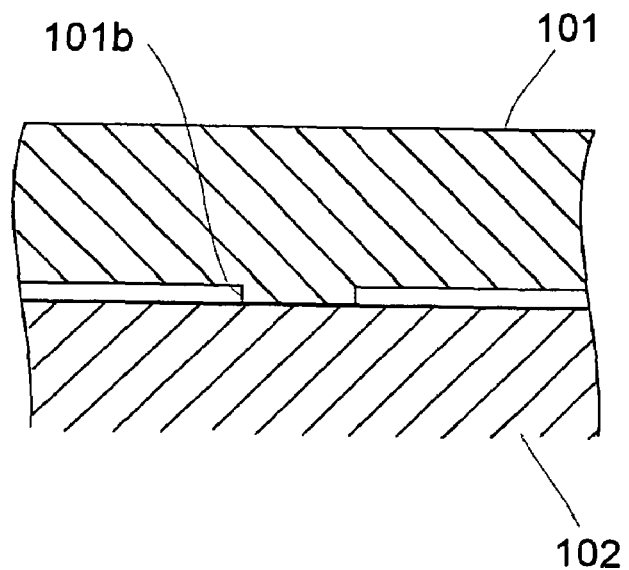
FIG. 7 shows a cross section of the die cut along the dashed dotted line in FIG. 6.
Figure 8:
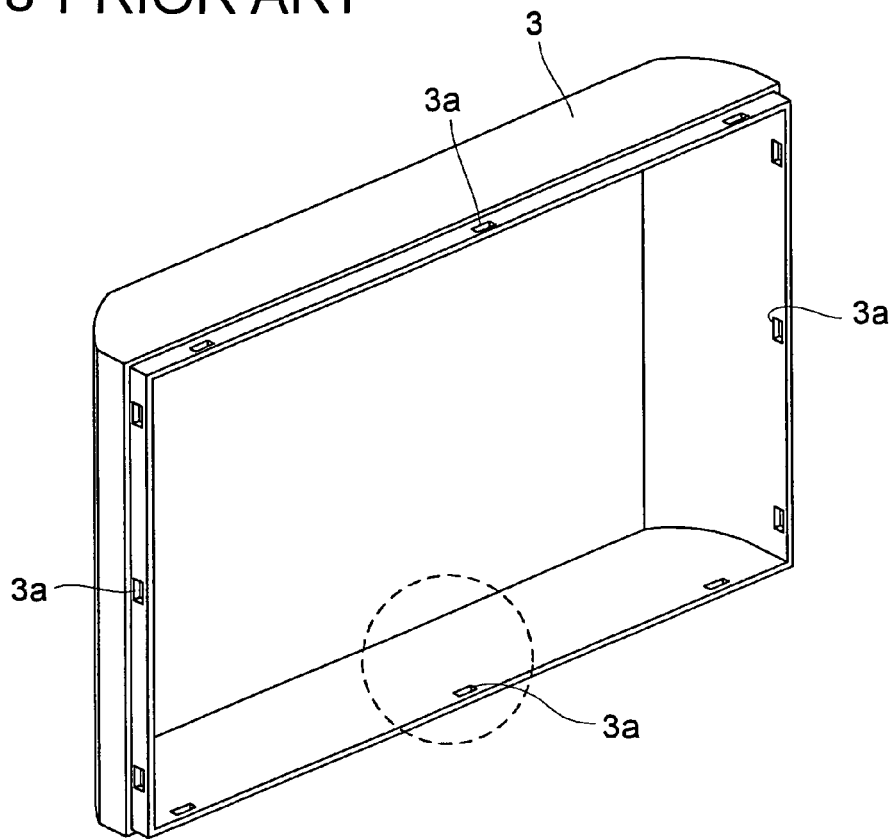
FIG. 8 is a perspective view of the conventional rear case viewed from the open side.
Figure 9:
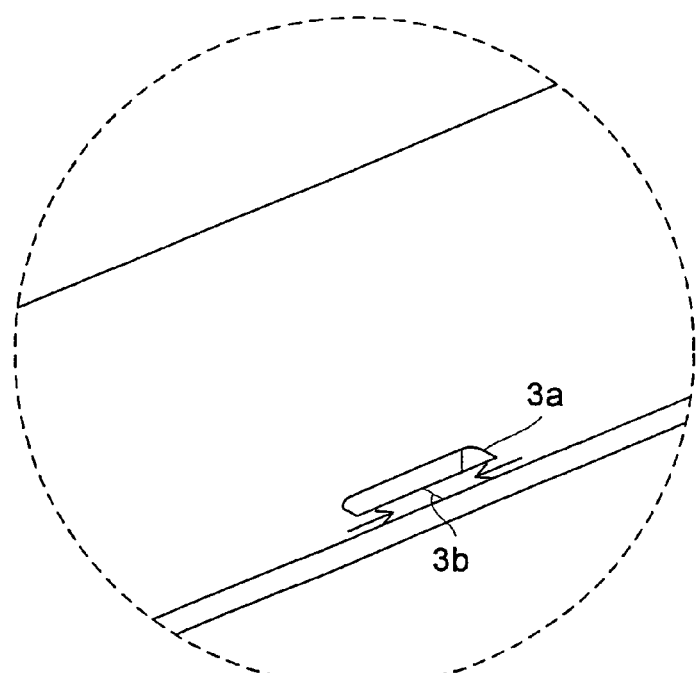
FIG. 9 is a magnified view of the part encircled by the broken line in FIG. 8.

Since the material is filled and cured also in the groove 102a of the second die 102 as described above, ribs 3c crossing individual engaging holes 3a in the short side direction are formed on the inner wall of the molded rear case 3 as shown in FIGS. 3 and 4. Thus, the periphery of the engaging hole 3a of the rear case 3 can be reinforced. Therefore, even if the hook 2a of the front case 2 and the engaging hole 3a of the rear case 3 are hard to catch each other, a breakage of the rear case 3 due to shortage of strength in the periphery of the engaging hole 3a can be prevented.

The present invention is not limited to the embodiment described above. For example, although the groove 102a of the second die 102 is provided only one for each of the protrusions 101b of the first die 101 in the example shown in FIGS. 1 and 2, it is possible to adopt another structure in which a plurality of grooves are provided for each of the protrusions 101b so as to be arranged in the longitudinal direction of the protrusion 101b. According to this structure, a plurality of ribs 3c crossing each of the engaging hole 3a in the short side direction are formed on the inner wall of the molded rear case 3. As a result, the periphery of the engaging hole 3a of the rear case 3 can be reinforced more strongly.

Although the liquid crystal television receiver is exemplified in the embodiment described above, the present invention can be applied to any cabinet of electronic equipment as long as it is constituted of first and second cases that are coupled so as to form the cabinet. In this case, the second case can be a detachable or pivoted lid with respect to the first case.

What is claimed is:

1. A hollow box-type cabinet of electronic equipment, comprising:
   a box-type first case made of resin with a first flat portion and a first circumference surface portion which stands from the surrounding edges of the first flat portion; and
   a box-type second case made of resin with a second flat portion and a second circumference surface portion which stands from the surrounding edges of the second flat portion, wherein
   a plurality of hooks are formed on an inner surface of the first circumference surface portion,
   a plurality of engaging holes are formed on the second circumference surface portion to engage with the plurality of hooks from an exterior of the second circumference surface portion when the first and the second cases are coupled,
   the engaging holes are formed elongated in the direction perpendicular to an engaging direction of the first and second cases,
   a rib that crosses the engaging hole in a shorter side direction is formed integrally on an inner surface of the second circumference surface portion, and
   the rib has a width narrower than a longer side of the engaging hole.

2. The cabinet of electronic equipment according to claim 1, wherein a plurality of the ribs are provided for the engaging hole so as to be arranged in the longitudinal direction of the engaging hole.

3. The cabinet of electronic equipment according to claim 2, wherein the electronic equipment is a liquid crystal television receiver.

* * * * *